United States Patent
Steiner

(10) Patent No.: US 10,631,561 B2
(45) Date of Patent: Apr. 28, 2020

(54) METHOD AND APPARATUS FOR PRODUCING MILK FOAM

(71) Applicant: Steiner AG Weggis, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 347 days.

(21) Appl. No.: 15/375,330

(22) Filed: Dec. 12, 2016

(65) Prior Publication Data

US 2017/0164644 A1 Jun. 15, 2017

(51) Int. Cl.
*A47J 31/46* (2006.01)
*A23L 2/54* (2006.01)
*A47J 31/44* (2006.01)

(52) U.S. Cl.
CPC ............ *A23L 2/54* (2013.01); *A47J 31/4403* (2013.01); *A47J 31/4485* (2013.01); *A47J 31/4489* (2013.01); *A47J 31/46* (2013.01)

(58) Field of Classification Search
CPC .... A47J 43/12; A47J 31/4489; A47J 31/4496; A47J 31/00; A47J 31/46; A47J 31/4403; A23C 9/1524; A23L 2/54
See application file for complete search history.

(56) References Cited

U.S. PATENT DOCUMENTS

| | | |
|---|---|---|
| 4,681,028 A | 7/1987 | Schmed et al. |
| 4,892,031 A | 1/1990 | Webster et al. |
| 5,367,947 A | 11/1994 | Lussi et al. |
| 5,957,033 A | 9/1999 | In-Albon |
| 6,298,769 B1 | 10/2001 | Stettes et al. |
| 7,017,474 B2 | 3/2006 | Comte |
| 7,472,641 B2 | 1/2009 | Doglioni Majer |
| 8,146,485 B2 | 4/2012 | Ozanne et al. |
| 8,479,643 B2 | 7/2013 | Aemisegger et al. |
| 2010/0075007 A1 | 3/2010 | Schindler et al. |
| 2011/0256289 A1 | 10/2011 | Steiner |
| 2013/0145936 A1* | 6/2013 | Dollner ............... A47J 31/4485 99/293 |
| 2014/0116475 A1 | 5/2014 | Steiner |
| 2014/0322412 A1* | 10/2014 | Buchholz ................. A01J 11/04 426/474 |
| 2015/0327715 A1 | 11/2015 | Steiner |

FOREIGN PATENT DOCUMENTS

EP 3039999 A1 * 7/2016 ............. A47J 31/44
WO 20160150731 A1 9/2016

* cited by examiner

*Primary Examiner* — Hong T Yoo
(74) *Attorney, Agent, or Firm* — Brian Roffe

(57) ABSTRACT

In a method for producing milk foam, in particular for the preparation of drinks that contain milk foam in a coffee machine, a gaseous medium, in particular air, is delivered to milk conveyed, and the milk/air mixture that is formed is conveyed to an outlet for milk foam or drinks containing milk foam. The consistency of the milk foam that is produced is determined here and is monitored by a regulating process and/or is changed by a setting. Even with variable conditions of use and operation, perfect quality of the milk foam that is produced is guaranteed, in which, moreover, its consistency can be changed.

19 Claims, 1 Drawing Sheet

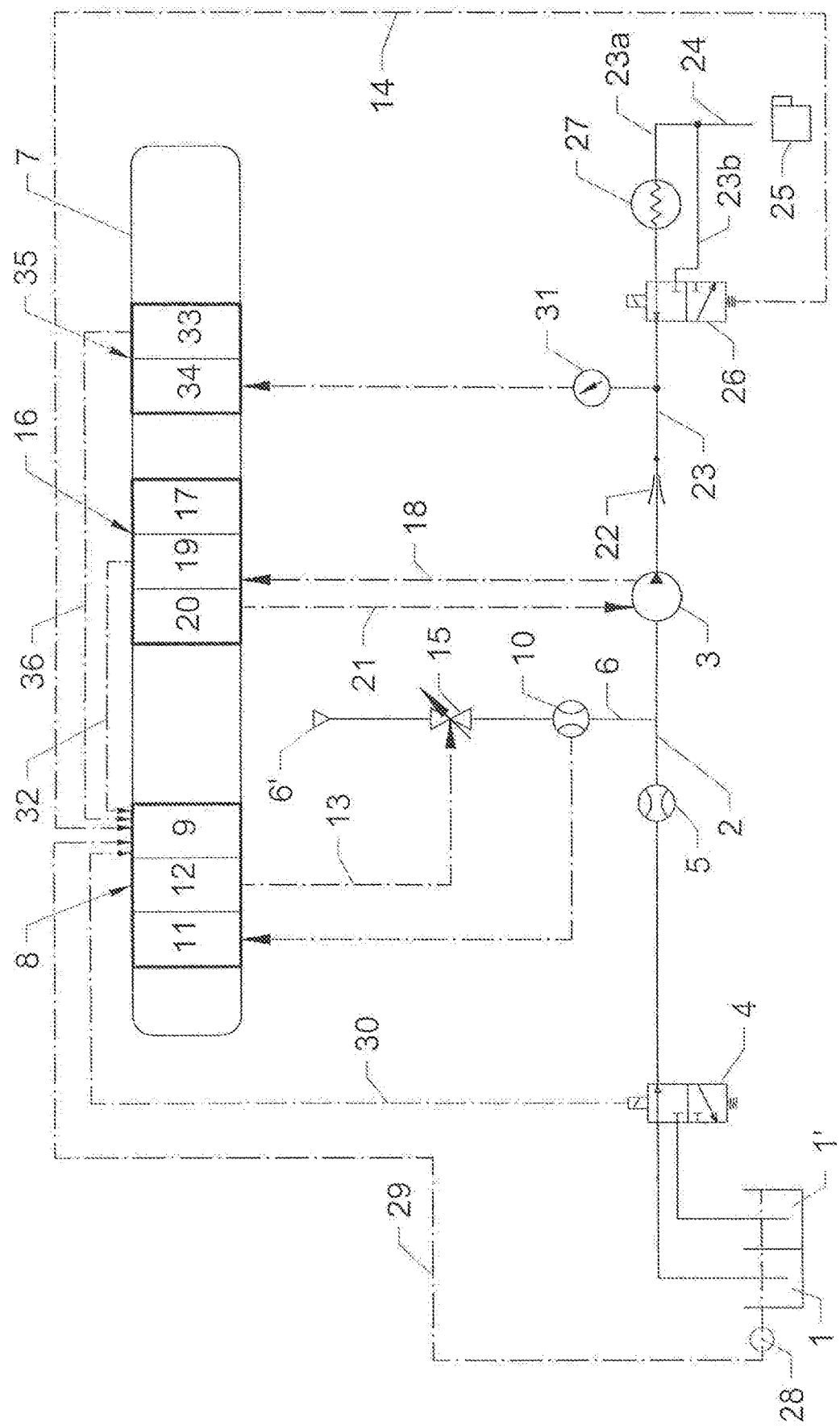

METHOD AND APPARATUS FOR PRODUCING MILK FOAM

FIELD OF THE INVENTION

The invention relates to a method for producing milk foam, in particular for the preparation of drinks that contain milk foam in a coffee machine, a gaseous medium, in particular air, being able to be delivered to the milk being conveyed, and the milk/air mixture that is formed being conveyed to an outlet for milk foam or drinks containing milk foam, the milk foam that is produced having a specific consistency.

BACKGROUND OF THE INVENTION

In a generic device for a coffee machine according to publication EP-A-2 120 656 B1, which corresponds to US 20100075007, it is possible to produce both cold and hot milk drinks as well as cold and hot milk foam for drinks containing milk foam such as cappuccino, latte macchiatto, white coffee or chocolate drinks.

As regards product quality, this type of coffee machine must always fulfil stringent requirements, even through its conditions of use and operation often vary. For example, for the quality of the milk froth that is produced the respectively prevailing atmospheric pressure plays an important role because, depending on the location of the coffee machine, be this on a mountain or at sea level, the amount of air that is supplied is affected by the different air pressures. Other factors are also the temperature and/or the nature of the type of milk that is used.

In the previously known coffee machines of the type specified at the start, the amount of air supplied can be set by hand by means of a throttle or similar means. However, during operation the amount of air which is set once is then exposed to the aforementioned disruptive factors that cause unintended fluctuations in the amount of air that is sucked in, and consequently the quality of the milk foam can change and be unsatisfactory.

OBJECTS AND SUMMARY OF THE INVENTION

An object underlying an embodiment of the invention is to avoid these disadvantages and to devise a method of the type specified at the start that guarantees a constantly perfect quality of the milk foam that is produced even with variable conditions of use and operation.

According to the invention, this object is achieved by a method for producing milk foam, in particular for the preparation of drinks that contain milk foam in a coffee machine, in which a gaseous medium, in particular air, is able to be delivered to the milk being conveyed, and the milk/air mixture that is formed is conveyed to an outlet for milk foam or drinks containing milk foam. The milk foam that is produced has a specific consistency determined and monitored by a regulating process and/or can be changed by adjusting. In an apparatus according to the invention, for implementing the method, the consistency of the milk foam that is produced is set by means of a circuit and/or in a regulating process at least one sensor determining consistency is provided as an actual value sensor for a regulating circuit with a target value sensor.

By means of this determination according to the invention of the consistency of the milk foam that is produced and of monitoring of the latter by a regulating process and/or by setting the consistency, on the one hand the quality of the milk foam can always be kept optimal with changing operating conditions, and its consistency can be set as desired.

During the regulating process this consistency of the milk foam that is produced is determined, and if it deviates from a target value it is changed, in particular by controlling the amount of air that is supplied, and so this consistency always corresponds approximately to the target value.

Furthermore, the invention makes provision such that the target value of the amount of air supplied can be set dependently upon the temperature and/or the consistency of the milk foam that is to be produced. This makes it possible to regulate precisely the amount of air in cold as well as in hot drinks that contain foam. This also applies to the preparation of drinks with different foam consistencies.

Furthermore, the invention makes provision such that the target value of the amount of air supplied can also be set dependently upon the type of milk used and/or the filling level of the milk storage container. This enables specific settings, for example for long-life milk, whole milk or skimmed milk respectively. The same also applies to operation with a full or with an almost empty milk container.

The apparatus according to the invention is made up of largely standardized components that take up a small amount of space and can easily be incorporated into new and used coffee machines. The apparatus is also easy to remove and so can be inserted into different types of machine.

Very advantageously, at least one sensor that determines consistency is provided as an actual value sensor for a regulating circuit, this being able to take place by means of a capacitive measurement or an electrical resistance measurement.

Furthermore, the invention makes provision such that the target value sensor of the air quantity regulation system can be adjusted by a valve that controls the heating of the milk foam and/or by the power consumption of the pump as a measurement for the consistency of the milk foam. In this way the air quantity regulation is effective for cold as well as for hot drinks, independently of the type of drink to be produced and of the respectively suitable degree of consistency of the milk foam.

The apparatus according to the invention can also be provided with a regulating circuit for the amount of current for the pump, this different amount of current allowing one to draw a conclusion regarding the consistency of the milk foam.

In order to set the target value sensor, the milk storage container can also be provided with a milk type display and/or a filling level display and/or a temperature display operatively connected to said sensor. In this way the amount of air supplied can be regulated according to the type of milk used and/or the filling level of the milk container.

In coffee machines that are provided with a coffee grinder that automatically regulates the degree of grinding, for the purpose of optimized product quality it is advantageous, if so required, to also take into account the degree of grinding of the coffee when setting the target value sensor.

BRIEF DESCRIPTION OF THE DRAWING

In the following, the invention is described in more detail by means of an exemplary embodiment with reference to the drawing. This shows as follows:

FIG. 1 is a diagram of an apparatus according to the invention for producing milk foam and/or drinks that contain milk foam.

DETAILED DESCRIPTION OF THE INVENTION

The apparatus according to FIG. 1 has one or more milk containers 1, 1' from which cold milk is sucked in via a suction line 2 by means of a pump 3. The milk containers 1, 1' can optionally be connected to the suction line 2 by means of a directional valve 4. The milk containers 1, 1' can contain different types of milk, such as long-life milk, full milk or skimmed milk, as well as milk with additives such as chocolate, vanilla, etc. In the suction line 2, there is also preferably a measuring device 5 with which the flow volume of the milk sucked in by the pump 3 can be measured.

This apparatus can be made as a separate unit. However, it can also advantageously be a component of a commercially available coffee machine.

In order to produce the milk foam, a specific amount of air or a comparable gas medium is mixed into the milk via an air supply line 6 with an air inlet 6' that opens out into the suction line 2. Needless to say, the supply of air for the outlet can also be disabled so as to only allow hot or cold milk to pass out without producing foam.

On its part, the pump 3 is equipped with a speed regulator integrated into the apparatus and which is composed of a target value sensor 17, an actual value sensor 20 actuated via the motor power supply line 21 and a signal sensor 19 determining the deviation of the actual value from the target value via the line 18 and the readjusting of the pump speed that optionally takes place via the line 21.

In the suction line 2 for the milk, and optionally for air, directly after the pump 3 or after a line section there is a throttle point 22 which can be a throttle valve or a nozzle the passage opening of which first of all tapers and is then extended. It thus facilitates the transformation of the milk/air mixture that is supplied into milk foam. This throttle point 22 could also be connected directly to the pump 3.

Following on from the suction line 2 that leads to the pump 3 is a line 23 which has an outlet line 24 provided as a pipe or tube that is preferably up to 30 cm long so that the milk foam continues to form in this line and can be stabilized such that a high-quality foam with a consistency that remains constant is produced when it is poured, for example, into a cup 25.

The apparatus makes it possible to optionally produce cold and hot milk foam by the line 23 having two parallel sections 23a, 23b that can optionally be activated by a directional valve 26, the line section 23a being provided with a flow heater 27. If the milk foam is conveyed through the line section 23a, hot milk foam or a hot drink that contains foam is produced in the outlet line 24. Otherwise, the milk foam is conveyed directly via the line section 23b into the outlet line 24 and can be withdrawn here as cold milk foam or as a cold drink that contains foam. This could also be connected directly to the pump 3. Furthermore, a throttle point 22 could be provided at each of these parallel sections 23a, 23b.

According to the invention, the milk foam that is produced is monitored by a regulating process with determination of its consistency or is changed by its consistency being adjusted.

During the regulating process, this consistency of the milk foam that is produced is determined, and if it deviates from a target value it is changed in particular by controlling the amount of air supplied so that this consistency always corresponds approximately to the target value. For this purpose, a sensor 31 that determines the consistency is provided as an actual value sensor for a regulating circuit 35 with a target value sensor 33 which is connected to the target value sensor 9 or to the regulating circuit 8 of the air quantity regulator.

The respective sensor 31 is designed such that it can be used to determine the consistency by measuring electrical properties of the milk foam as it flows through a line 23 before the outlet line 24. This determination of the consistency of the milk foam can take place by means of a capacitive measurement or a resistance measurement in which the electrical resistance changes due to the different quantities of air bubbles contained within the milk foam.

In addition or alternatively, provision can be made such that the consistency of the milk foam is determined by measuring the power consumption of the pump 3, this taking place at the same speed according to the regulation of the pump 3 described above. As the consistency becomes more creamy, the conveyance resistance of the milk, and so the power consumption of the pump 3, increases, and conversely, this resistance decreases with a higher liquid percentage of the milk foam. Advantageously, a sensor or measuring means connected to the regulating circuit 16 via the line 18 is integrated into the pump 3 in order to measure the power consumption. Deviations from the target value are then delivered to the target value sensor 9 of the air quantity regulation system via the line 32 so that with this measurement of the power consumption of the pump a reliable value for achieving optimal consistency of the milk foam is made possible.

Within the framework of the invention, the consistency of the milk foam that is produced can also be set to different values with or without the regulation described above by there being provided in the control system 7 a circuit in which, for example, two different consistencies can be selected—one for cappuccino and the other for producing a graphic pattern on the surface of the drink that has been poured in, for example a heart, a flower or a plant shape or the like is drawn.

In automated operation for a coffee machine, this setting from one to another consistency value can also take place automatically depending on which drink has been chosen.

Another advantage is that with this sensor 31 or with an additional sensor the hardness of the water and/or the concentration of the cleaning product in the cleaning process of the apparatus can also be detected. Thus, by means of a regulation system (not detailed), the amount of cleaning product can be adjusted or malfunctions can be investigated and reported while cleaning. Once again, in this connection the sensor would function on the basis of a capacitive measurement or a measurement of the electrical resistance of the liquid.

The amount of air that is included is essential for the quality of the milk foam or of the drink that contains milk foam. So that it always remains optimal during operation, independently of variable factors, such as for example atmospheric pressure, the apparatus has an air quantity regulator 8 that is integrated into the control system 7 of the coffee machine and which is composed of an automatically adjustable target value sensor 9, a flow rate measuring device 10, an actual value sensor 11, a signal sensor 12 (that signals the deviation of the actual value from the target value), a proportional or a throttle valve 15 controlled by the signal sensor 12 via the line 13 as a regulating element for closing and opening the air supply line 6.

The proportional valve 15 offers the advantage of enabling particularly sensitive air quantity regulation. Within the framework of the invention it is needless to say also possible, however, to use other comparably operating valves or so-called actuators as regulating elements.

The adjustment of the target value sensor 9 for the air quantity regulator 8 takes place automatically by including the essential parameters which, in the exemplary embodiment described, are on the one hand the type of milk and/or the filling level as well as the temperature of the milk container 1 or 1' which is respectively in operation. For this purpose, appropriate display elements 28 are provided in the milk containers 1, 1' which are effective for the target value sensor 9 via the line 29.

The allocation of the target value setting to the individual containers takes place via the line 30 by means of which the respective switching position of the directional valve 4 is indicated. Depending on the filling level of a respective milk container 1 or 1', with the same pump output more milk is sucked up when these containers are full, or less milk is sucked up when the container or containers is or are almost empty. Therefore, more or less air is accordingly supplied so that this remains the same in proportion to the milk that is being conveyed.

The temperature of the milk foam serves as another parameter for the adjustment of the target value sensor 9. For this purpose, the directional valve 26 is connected to the target value sensor 9 via a line 14, by means of which the respective operating state "cold or hot milk foam" of the directional valve 26 is indicated to the target value sensor 9.

In the exemplary embodiment described, the target value sensor 9 is also adjusted via the line 32 dependently upon the current power consumption of the pump 3. Sometimes, the amount of power is dependent upon the consistency of the milk foam that is being prepared because the pump 3 has to work harder with a denser consistency for the same quantity output. In this way, it is possible to regulate the foam consistency by means of the motor power supply line 18 of the pump 3 and to program the pump 3 depending on the type of product to be processed, for example cappuccino, latte macchiato, white coffee, or for example, a chocolate drink.

The apparatus described is designed as a component of an automatic coffee machine. However, it can also easily work as an independent device, or it can also be fitted subsequently into existing machines.

The apparatus according to the invention is characterized in that the actual apparatus is simple, and that it does not necessitate any manual adjustment of the amount of air supplied because it is adjusted automatically using the essential parameters. These can be selected from case to case depending on the conditions of use.

Needless to say, this regulation could also take place by means of different variants. Thus, instead of a proportional or metering valve, a check valve or the like, for example, could also be used as a regulating element.

Instead of a pump 3 or a throttle point 22 for sucking in the milk, sucking in by means of the tried and tested Venturi system with steam injection or similar could also be used.

Depending on the use of an apparatus according to the invention or a coffee machine, one or a number of parameters may be advantageous for the target value setting/s.

The invention is sufficiently displayed by the exemplary embodiments described above. Needless to say, it could also be explained by further variations. Thus, a number of sensors could also be provided, for example, on each of the two line sections 23a, 23b.

In principle, the change in consistency of the milk foam that is produced could also be achieved by mechanical means, for example by using different throttling means at the throttle point by means of an adjustable valve or by changing the pump speed.

The invention claimed is:

1. A method for producing milk foam having a desired consistency, comprising:
   delivering a gaseous medium to milk while the milk is being conveyed through a machine from a source of milk to form a milk/gaseous medium mixture;
   conveying the milk/gaseous medium mixture to an outlet of the machine using a pump while producing milk foam from the milk/gaseous medium mixture;
   determining the consistency of the milk foam prior to outlet of the milk foam from the machine and monitoring the determined consistency of the milk foam to determine whether the determined consistency deviates from the desired consistency of the milk foam by a regulating process;
   adjusting the delivering of the gaseous medium to the milk by adjusting an amount of the gaseous medium being delivered to the milk; and
   adjusting the conveying of the milk/gaseous medium mixture to the outlet when the determined consistency of the milk foam is different than the desired consistency of the milk foam by adjusting a speed of operation of the pump,
   whereby the adjustment of the delivering of the gaseous medium to the milk and the adjustment of the speed of operation of the pump cause a change in the consistency of the milk foam.

2. The method of claim 1, further comprising adjusting the delivering of the gaseous medium to the milk based on temperature of the milk foam at the outlet of the machine.

3. The method of claim 1, further comprising enabling setting of the machine to provide different values of the desired consistency of the milk foam at the outlet of the machine.

4. The method of claim 1, wherein the step of determining the consistency of the milk foam prior to outlet of the milk foam from the machine comprises measuring electrical properties of the milk foam during flow of the milk foam in the machine to the outlet.

5. The method of claim 1, wherein the step of determining the consistency of the milk foam prior to outlet of the milk foam from the machine comprises measuring power consumption of the pump at a first time, measuring power consumption at a second time while the pump operates at a common speed as at the first time, and comparing the measured power consumption whereby a change in power consumption from the first time to the second time correlates to a change in resistance in conveyance of the milk foam by the pump with an increase in power consumption being indicative of an increase in consistency of the milk foam and a decrease in power consumption being indicative of a decrease in consistency of the milk foam.

6. The method of claim 1, further comprising enabling setting of the machine to provide a plurality of possible desired consistencies of the milk foam at the outlet of the machine by controlling the amount of gaseous medium being delivered to the milk.

7. The method of claim 1, wherein the step of determining the consistency of the milk foam prior to outlet of the milk foam from the machine comprises measuring a percentage of gaseous medium in the milk foam by volume prior to outlet of the milk foam from the machine.

8. The method of claim 1, wherein the step of monitoring the determined consistency of the milk foam to determine whether the determined consistency deviates from the desired consistency of the milk foam comprises determining whether an actual value of the determined consistency of the milk foam deviates from a target value of the consistency of the milk foam, the speed of operation of the pump being adjusted when the actual value deviates from the target value.

9. The method of claim 8, wherein the amount of the gaseous medium being delivered to the milk is adjusted when the actual value deviates from the target value.

10. The method of claim 1, wherein the gaseous medium is air.

11. The method of claim 1, wherein the step of conveying the milk/gaseous medium mixture to the outlet of the machine using the pump comprises directing the milk foam selectively through only one of a plurality of sections and changing the temperature of the milk foam as the milk foam passes through a first one of the sections such that the milk foam passing through the first one of the sections has a different temperature at the outlet of the machine than the milk foam passing through a second one of the sections at the outlet of the machine.

12. The method of claim 1, wherein the step of conveying the milk/gaseous medium mixture to the outlet of the machine using the pump comprises directing the milk foam through only one of a plurality of parallel sections and changing the temperature of the milk foam as the milk foam passes through a first one of the sections such that the milk foam passing through the first one of the sections has a different temperature at the outlet of the machine than the milk foam passing through a second one of the sections at the outlet of the machine.

13. The method of claim 1, wherein the step of conveying the milk/gaseous medium mixture to the outlet of the machine using the pump comprises directing the milk foam through a directional valve having a first state in which the milk foam flows through a first section and a second state in which the milk foam flows through a second, different section, the method further comprising adjusting the temperature of the milk foam flowing through the first section without adjusting the temperature of the milk foam flowing through the second section such that the milk foam passing through the first section has a different temperature at the outlet of the machine than the milk foam passing through the second section at the outlet of the machine.

14. The method of claim 13, further comprising determining the state of the directional valve, the delivering of the gaseous medium to the milk being adjusted based on the determined state of the directional valve which provides an indication of the temperature of the milk foam at the outlet of the machine.

15. A method for producing milk foam, comprising:
delivering a gaseous medium to milk while the milk is being conveyed through a machine from a source of milk to form a milk/gaseous medium mixture;
conveying the milk/gaseous medium mixture to an outlet of the machine;
adjusting an amount of the gaseous medium being delivered to the milk based on an adjustable target value related to consistency of the milk foam at the outlet of the machine; and
adjusting the target value to cause a change in the amount of the gaseous medium being delivered to the milk based on temperature of the milk foam at the outlet of the machine,
whereby the change in the amount of the gaseous medium being delivered to the milk causes a change in the consistency of the milk foam at the outlet of the machine wherein the step of conveying the milk/gaseous medium mixture to the outlet of the machine comprises directing the milk foam selectively through only one of a plurality of sections and changing the temperature of the milk foam as the milk foam passes through a first one of the sections such that the milk foam passing through the first one of the sections has a different temperature at the outlet of the machine than the milk foam passing through a second one of the sections at the outlet of the machine.

16. The method of claim 15, further comprising adjusting the target value to cause a change in the amount of the gaseous medium being delivered to the milk based on a type of the milk.

17. The method of claim 15, further comprising adjusting the target value to cause a change in the amount of the gaseous medium being delivered to the milk based on a filling level of milk in a milk storage container constituting the source of milk.

18. The method of claim 15, further comprising adjusting the target value to cause a change in the amount of the gaseous medium being delivered to the milk based on a temperature of the milk in the source of milk.

19. The method of claim 15, further comprising adjusting the target value to cause a change in the amount of the gaseous medium being delivered to the milk based on a desired consistency of the milk foam to be obtained from the machine.

* * * * *

UNITED STATES PATENT AND TRADEMARK OFFICE
CERTIFICATE OF CORRECTION

PATENT NO. : 10,631,561 B2
APPLICATION NO. : 15/375330
DATED : April 28, 2020
INVENTOR(S) : Adrian Steiner It is certified that error appears in the above-identified patent and that said Letters Patent is hereby corrected as shown below:

On the Title Page

Item (30), insert:
--(30) Foreign Application Priority Data
Dec. 15, 2015 (CH)..........................01853/15--

Signed and Sealed this
Second Day of June, 2020

Andrei Iancu
*Director of the United States Patent and Trademark Office*